United States Patent [19]

Hummel

[11] Patent Number: 5,425,024
[45] Date of Patent: Jun. 13, 1995

[54] METHOD FOR MULTI-ADDRESS TRANSMISSION OF CELLS IN A SWITCHING STRUCTURE OF A COMMUNICATION SYSTEM OPERATING IN THE ASYNCHRONOUS TRANSFER MODE

[75] Inventor: Heinrich Hummel, Bergkirchen, Germany

[73] Assignee: Siemens Aktiengesellschaft, Munich, Germany

[21] Appl. No.: 121,162

[22] Filed: Sep. 14, 1993

[30] Foreign Application Priority Data

Sep. 14, 1992 [DE] Germany .................. 42 30 743.0

[51] Int. Cl.$^6$ .............................................. H04J 3/26
[52] U.S. Cl. ...................................... 370/60; 370/94.1
[58] Field of Search ................... 370/54, 58.1, 58.2, 370/58.3, 60, 60.1, 94.1, 94.2; 340/825.8, 826, 825.03

[56] References Cited

U.S. PATENT DOCUMENTS

| | | | |
|---|---|---|---|
| 4,701,906 | 10/1987 | Ransom et al. | 370/60 |
| 4,956,839 | 9/1990 | Torii et al. | 370/60 |
| 5,084,867 | 1/1992 | Tachibana et al. | 370/60 |
| 5,119,369 | 6/1992 | Tanabe et al. | 370/60 |
| 5,126,999 | 6/1992 | Munter et al. | 370/60 |
| 5,166,926 | 11/1992 | Cisneros et al. | 370/60 |
| 5,265,088 | 11/1993 | Takigawa et al. | 370/58.2 |
| 5,271,010 | 12/1993 | Miyake et al. | 370/60 |

OTHER PUBLICATIONS

"ATM: Technologie für zukünftige Breitbandnetze", published by Siemens AG, order number A30930-N15-50-P25-1-29, pp. 1-22. (No translation).

*Primary Examiner*—Douglas W. Olms
*Assistant Examiner*—Chau T. Nguyen
*Attorney, Agent, or Firm*—Hill, Steadman & Simpson

[57] ABSTRACT

A method for multi-addressed transmission of cells in a switching structure of a communication system operating in the asynchronous transfer mode. Instead of internal routing information (ri) for non-multi-addressed cells (Z), row index information (zi) and multi-addressing information (rsi) are inserted into an internal cell header (IKZ) of the communication system of multi-addressed cells (RZ). After the reception of a multi-addressed cell (RZ) in a switching element (KE) of the switching structure, a prescribed row (Z1...Zn) of a multi-addressing matrix (RSM), that is provided with routing information (kri) that is individually associated to switching elements, is identified with the assistance of the row index information (ZI). The switching paths of the multi-addressed cell (RZ) in the respective switching element (KE) are defined by the routing information (kri) individually associated to the switching elements. The routing information (kri), that is individually associated to the switching elements and is formed of path information (wi) and of row index or cell routing information (zi, zri), is calculated by a communication system controller (ST) with the assistance of the subscriber signalling information and is entered into the multi-addressing matrix (RSM). In this method the structure of the internal cell header (IKZ) of the communication system is preserved.

13 Claims, 1 Drawing Sheet

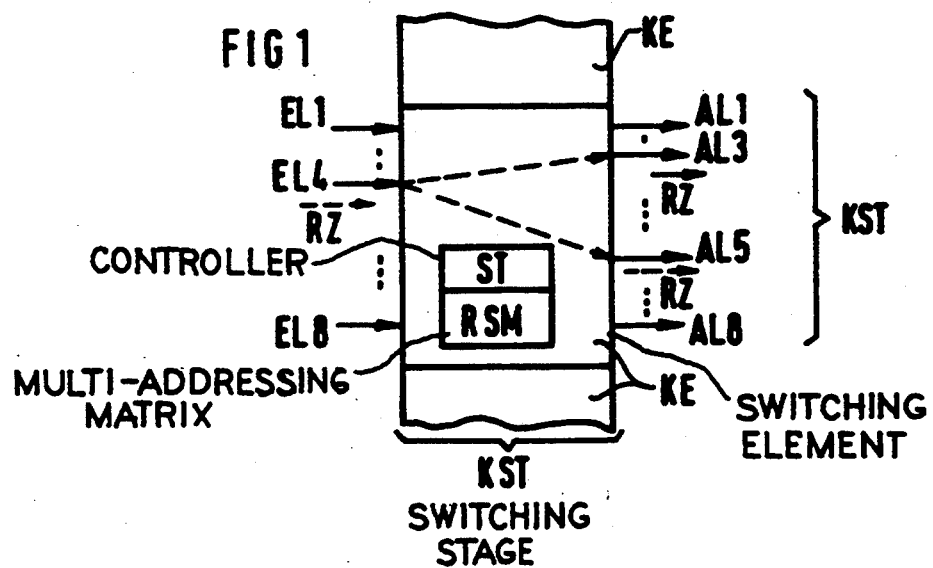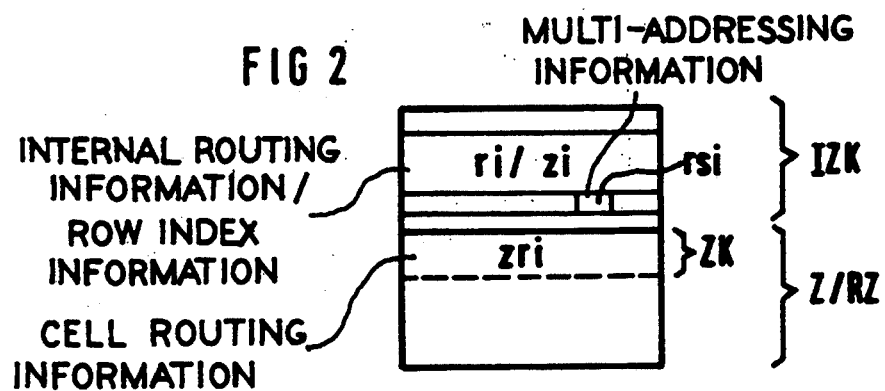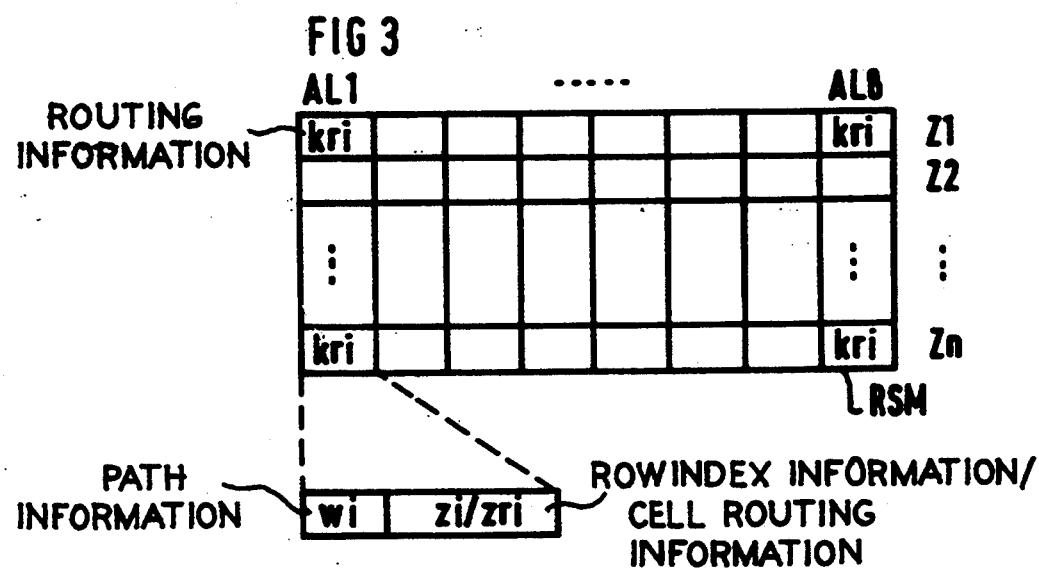

5,425,024

METHOD FOR MULTI-ADDRESS TRANSMISSION OF CELLS IN A SWITCHING STRUCTURE OF A COMMUNICATION SYSTEM OPERATING IN THE ASYNCHRONOUS TRANSFER MODE

BACKGROUND OF THE INVENTION

Switching structures or switching networks operating according to an asynchronous transfer mode are provided for future communication systems, particularly broadband networks. In this asynchronous transfer mode, packets having a fixed length, these being referred to as cells in the technical field, are transmitted in uninterrupted fashion on every transmission section. These cells are composed of 48 octets for the useful information and of 5 octets of cell routing information for the cell header. When no useful information is to be transmitted at the moment, specifically marked idle signals are transmitted.

A switching network operating according to the asynchronous transfer mode is structured into one or more switching stages, similar to the switching network of traditional digital communication systems, whereby the individual switching stages are meshed with one another such that a largely blocking-free switching structure arises. The input and output lines of such a switching structure are identified from the cell routing information recited in the cell header of the cell, i.e. from virtual routing information and virtual channel information. These switching-oriented information are derived from the multi-addressing and destination information signalized by the subscribers of a communication system, i.e. telephone numbers of the destination subscribers.

It is known from the publication "ATM-Technologie fuer zukuenftige Breit-bandnetze" of Siemens AG, page 17, right-hand column, to additionally identify routing information for the switching of a cell through a switching structure from the cell routing information recited in the cell header of the cell and to attach this to the cell. With the assistance of these internal routing information, the respective cell seeks the defined path through an n-stage switching structure under self-control, i.e. without the cooperation of a central communication system controller. As used herein the term "self-control" refers to the self-routing of cells. The additional, internal routing information are inserted into an internal cell header of the communication system and are set in front of the respective cell. After the self-switching of the cell through the switching structure, the internal cell header of the communication system is again removed.

The data scope of the cell routing information or of the internal cell header of the communication system is essentially defined by the plurality of switching stages, whereby one information string, for example, one byte is usually provided for a switching stage, these being compiled to form a block. Internal cell headers of the communication system are being defined to an increasing degree that have a prescribed plurality of information strings matched to the maximum plurality of switching stages, for example 5 bit octets or bytes for 5 switching stages.

In the case of multi-address transmission of cells to a plurality of output lines of the switching structure, the self-control principle of the cells can no longer be maintained without further measures given internal cell headers of the communication system structured in this way.

SUMMARY OF THE INVENTION

It is an object of the present invention to provide switching cells to be multi-addressed through an n-stage switching structure while retaining to a high degree the self-control principle, that is, the self-routing principle, and of the cell headers previously employed.

The object of the present invention is achieved by a method for multi-address transmission of cells in an n-stage switching structure of a communication system operating in the asynchronous transfer mode. A switching stage is formed by switching elements. For the purpose of a cell self-control through the switching structure with the assistance of subscriber-signalled multi-addressed originating and destination information, an internal cell header of the communication system that is provided with internal routing information is attached by a switching structure controller preceding every cell. In the case of multi-addressed connections,s the internal routing information is formed by a multi-address and by row index information. A multi-addressing matrix is allocated to every switching element, routing information that is calculated with the assistance of the switching structure controller, that is individually associated to the switching elements and that is respectively formed by path information and partially by row index or cell routing information, is respectively entered column-by-column in the multi-addressing matrix into a respective line representing a multi-addressing connection. The columns of the multi-addressing matrix each respectively represent an output line of the switching element. After the reception of a multi-addressed cell in the respective switching element of the switching structure, the addressed row in the multi-addressing matrix is identified with the assistance of the indicated row index information. Dependent on the routing information individually associated to the coupling elements that is recited in the identified row, the cells are multi-addressed to at least one output line of the switching element. Before the forwarding of a cell to a further switching element of the switching structure, further row index information contained in the routing information individually associated to the switching elements is inserted into the internal cell header of the communication system instead of the indicated row index information. The further row index information is inserted for the purpose of identifying the row of the multi-addressing matrix in the further switching element.

An important aspect of the method of the invention is that a multi-addressing matrix is allocated to each of the switching elements that forms a switching stage, routing information that indicate the switching paths of a multi-addressed cell in the respective switching element that are individually associated to the switching elements and are entered in a respective line representing a multi-addressing connection being entered in the multi-addressing matrix. An output line of the respective switching element is thereby allocated to every column of the multi-addressing information. Given multi-addressed cells, a multi-addressing information and a row index information are inserted into the internal cell header of the communication system before the forwarding of a cell to the switching structure. After the reception of a multi-addressed cell in a switching element, the relevant row in the allocated multi-addressing matrix is identified on the basis of the recited row information and the cell to be multi-addressed is switched to the allocated output lines of the switching elements dependent on the routing information individually associated to the switching elements that are recited in this row. Before the forwarding of the cell to a further switching element of the switching structure, a further row index information that is contained in the routing information individually associated to the switching elements is inserted into the internal cell header of the communication system instead of the indicated row index information for the purpose of determining the row of the multi-addressing matrix in the further switching element.

In an advantageous development of the method of the present invention, the cell routing information, that is entered in the multi-addressing matrix and that is potentially translated, is inserted into the cell before the forwarding of the cell to an output of the switching element that represents an output of the switching structure and the internal cell header of the communication system is removed. Dependent on the position of the switching structure in a communication network, the cell routing information effecting the control of the cell through the communication network is potentially translated with the assistance of the switching structure controller.

In another advantageous development of the method of the present invention, routing information individually associated to the switching elements is formed by path information that indicates the non-forwarding insofar as the multi-addressed cell is not to be forwarded to an output line of the switching element defined by the column of the multi-addressing matrix or is formed by a path information indicating the forwarding of the cell and by a cell index or cell routing information insofar as the multi-addressed cell is to be switched to an output line of the switching element.

After the verification of a routing information individually associated to the switching elements that is recited in the row of the multi-addressing matrix identified by the received row index information and that is formed by a path information indicating the non-forwarding, the appertaining cell in each of the switching elements is not communicated to that output line of the switching element in whose allocated column of the multi-addressing matrix the routing information individually associated to the switching elements is entered. When the routing information individually associated to the switching elements is formed by path information indicating a forwarding and by row index information, the multi-addressed cell is communicated to the appertaining output line, whereby the verified row index information is inserted into the internal cell header of the communication system instead of the received row index information. When the routing information individually associated to the switching elements is formed by a path information indicating a forwarding and by a potentially translated cell routing information, the appertaining cell is communicated to the allocated output line of the switching element that represents an output line of the switching structure. The internal cell header of the communication system is removed and the potentially translated cell routing information is inserted into the cell header of the cell instead of the cell routing information. The verification of the internal cell header of the communication system of multi-addressed cells and the switching of these cells to be multi-addressed is particularly advantageously effected by a multi-addressing routine implemented in every switching element. The multi-addressing routine advantageously realized by programs has the multi-addressing matrix respectively allocated to it.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a switching element of a switching structure;

FIG. 2 depicts the structure of an ATM cell; and

FIG. 3 depicts a multi-addressing matrix in a switching element of FIG. 1.

DESCRIPTION OF THE PREFERRED EMBODIMENT

FIG. 1 shows one of a plurality of switching elements KE of a switching stage KST. A switching structure (not shown) is usually formed by one switching stage KST for small communication systems and by a plurality of switching stages KST for larger communication systems. Given larger switching structures, the communication stages are meshed with one another, i.e. output lines AL1 ... AL8 or, respectively, input lines EL1 ... EL8 of the switching elements KE are connected to one another in a prescribed way. Let it also be assumed for the exemplary embodiment that the switching element KE is provided for switching cells formed in the asynchronous transfer mode (ATM). The fundamental structure of such a cell Z is shown in FIG. 2. The cell Z contains a cell header ZK into which the cell routing information zri are inserted. This cell routing information zri is a matter of virtual path information and virtual channel information with whose assistance the appertaining cell Z is switched through a communication network operating in the asynchronous transfer mode. For the purpose of a cell self-control through the switching structure, an internal cell header IZK of the communication system provided with internal routing information ri is attached for every cell Z. With the assistance of this internal routing information ri, the respective cell Z seeks a defined path through an n-stage switching structure under self-control, i.e. without the cooperation of a central communication system controller. A region for the entry of a multi-addressing information rsi is also provided in the internal cell header IZK of the communication system. Let it be assumed for the exemplary embodiment that a multi-addressing information rsi is entered as, for example, a binary information (for example, zero), as a result whereof the cell Z is identified as a multi-addressed cell. Given multi-addressed cells Z, a row index information zi is inserted into the internal cell header IZK of the communication system instead of the standard internal routing information ri.

A controller ST having an allocated multi-addressing matrix RSM is also provided in the switching element KE. The controller ST can represent a separate controller for the respective switching element KE, a part of the switching stage controller or of a switching structure controller.

Let it be assumed for the exemplary embodiment that a multi-addressed cell RZ is received at the fourth input line EL4 of the switching element KE. In addition to the multi-addressing information rsi, row index information zi that, for example, indicates the second row Z2 of a multi-addressing matrix RSM is inserted in the internal cell header ZK of the communication system.

The fundamental structure of a multi-addressing matrix RSM allocated to every switching element KE is shown in FIG. 3. The multi-addressing matrix RSM has n rows Z1 ... Zn, whereby every row Z1 ... Zn has a multi-addressing connection (virtual or logical multi-addressing connection) allocated to it. As a result of the eight output lines AL1 ... AL8 of the switching element KE indicated in FIG. 1, the multi-addressing matrix RSM has eight columns AL1 ... AL8. Routing information kri individually associated to the switching elements is entered into every column AL1 ... AL8 for every multi-addressing connection. FIG. 3 also shows that routing information kri individually associated to the switching elements is formed by path information wi and by row index information zi or by cell routing information zri. The path information wi thereby represents the essential routing information. This indicates whether the respective multi-addressed cell RZ is forwarded to that output line AL1 ... AL8 in whose column the path information wi is entered and, insofar as forwarding is indicated, whether the respective output line AL1 ... AL8 represents the output line of the switching structure or whether the output line is connected to a further switching element KE. The path information wi, for example, is realized by a binary information 00,01 or 10 covering two bits. When the path information wi, for example, 10, indicates the forwarding of the multi-addressed cell RZ to a further switching element KE, then the following row index information zi indicated in the multi-addressing matrix RSM is inserted into the internal cell header IZK of the communication system instead of the received row index information zi and the multi-addressed cell RZ is switched via the respective output line AL1 ... AL8. When, due to the recited path information wi, for example, 01, a forwarding of the multi-addressed cell RZ is provided to an output line AL1 ... AL8 which represents the output line of the switching structure, then the internal cell header IZK of the communication system is removed and the cell routing information zri indicated following the path information wi is inserted into the cell header ZK of the multi-addressed cell RZ. Due to an internal translation of the communication system, the cell routing information zri usually deviates from the cell routing information zri originally, contained in the cell header ZK.

Let it also be assumed for the exemplary embodiment that the multi-addressed cell RZ received at the fourth input line EL4 is to be switched to the third and fifth output line AL3, AL5 of the switching element KE due to the routing information kri individually associated to the switching elements that is recited in the second row Z2 of the multi-addressing matrix RSM. Let it also be assumed that all output lines AL1 ... AL8 are conducted to a further switching stage KST. Consequently, path information wi, for example, 10, that indicates the forwarding of the multi-addressed cell RZ and a further row index information zi are recited in the third and fifth column AL3, AL5 of the multi-addressing matrix RSM. All other columns AL1 ... AL8 of the second row Z2 of the multi-addressing matrix RSM are provided with path information wi, for example, 00, that represents the non-forwarding of the multi-addressed cell RZ. With the assistance of the controller ST, the multi-addressed cell RZ is switched to the third and fifth output line AL3, AL5, whereby the row index information zi contained in the multi-addressing matrix RSM in the third and fifth column AL3, AL5 are previously inserted into the internal cell header IZK of the communication system instead of the received row index information zi. The row Z1 ... Zn of the multi-addressing matrix RSM of the following switching element KE is identified by the currently inserted row index information zi. The routing information ri individually associated to the switching elements for the forwarding of the multi-addressed cell in the following switching element KE is stored in this row Z1 ... Zn.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for multi-address transmission of cells in an n-stage switching structure of a communication system operating in the asynchronous transfer mode, a switching stage being formed by switching elements, comprising the steps of:

providing, preceding every cell and for cell self-routing through the switching structure using subscriber-signalled multi-addressing originating and destination information, an internal cell header of the communication system that is provided with internal routing information by a switching structure controller, wherein for multi-addressed connections the internal routing information is formed by multi-addressing information and by row index information;

allocating multi-addressing matrices to the switching elements, the multi-addressing matrices having routing information that is calculated using the switching structure controller, the routing information being individually associated to the switching elements and being respectively formed by path information and partially by respective row index information or cell routing information, respective routing information being entered column-by-column in a respective multi-addressing matrix into a respective row thereof representing a multi-addressing connection, wherein each column of the respective multi-addressing matrix respectively represents an output line of the switching element; and identifying after reception of the multi-addressed cell in a respective switching element of the switching structure, an addressed row in the respective multi-addressing matrix using the respective row index information and, dependent on the respective routing information individually associated to coupling elements that are recited in the identified row, multi-addressing the cell to at least one output line of the respective switching element, wherein before forwarding of a cell to a further switching element of the switching structure, further row index information contained in routing information individually associated to the switching elements is inserted into the internal cell header of the communication system instead of the indicated row index information, said further row index information being inserted for the purpose of identifying a row of the multi-addressing matrix in the further switching element.

2. The method according to claim 1, wherein the method further comprises:

before forwarding of a cell to an output line of the switching element that is an output of the switching structure, inserting into the cell the cell routing information entered in the multi-addressing matrix into the cell and removing the respective internal cell header of the communication system.

3. The method according to claim 1, wherein the routing information individually associated to the switching elements is formed by one of:

path information indicating non-forwarding, given non-forwarding of a multi-addressed cell to an output line of the switching element defined by a column of the multi-addressing matrix; and given forwarding of the multi-addressed cell to an output line of the respective switching element, path information indicating the corresponding forwarding of the multi-addressed cell and by row index information or cell routing information.

4. The method according to claim 1, wherein the method further comprises:

verifying routing information that is individually associated to the switching elements and that is recited in a row of the multi-addressing matrix identified on the basis of received row index information;

when said routing information is formed by path information that indicates non-forwarding, not switching the multi-addressed cell in the switching elements to an output line of the switching element in whose allocated column of the multi-addressing matrix the routing information individually associated to the switching elements is entered;

when said routing information is formed by path information indicating forwarding and by row index information, switching the multi-addressed cell to an allocated output line, the row index information being inserted into the internal cell header of the communication system instead of the received row index information; and when said routing information is forwarded by path information indicating forwarding and by translated cell routing information, switching the appertaining multi-addressed cell to an allocated output line of the switching element that is an output of the switching structure, the internal cell header of the communication system being removed and the translated cell routing information being inserted into the cell header of the multi-addressed cell instead of the received cell routing information.

5. The method according to claim 1, wherein the method further comprises:

providing a multi-addressing routine in every switching element for verification of respective internal cell headers of the communication system of multi-addressed cells and for the switching of the multi-addressed cells.

6. A method for multi-address transmission of cells in an n-stage switching structure of a communication system operating in the asynchronous transfer mode, a switching stage being formed by switching elements, comprising the steps of:

providing, preceding every cell and for cell self-routing through the switching structure using subscriber-signalled multi-addressing originating and destination information, an internal cell header of the communication system that is provided with internal routing information by a switching structure controller, wherein for multi-addressed connections the internal routing information is formed by multi-addressing information and by row index information;

allocating multi-addressing matrices to the switching elements, the multi-addressing matrices having routing information that is calculated using the switching structure controller, the routing information being individually associated to the switching elements and being respectively formed by path information and partially by respective row index information or cell routing information, respective routing information being entered column-by-column in a respective multi-addressing matrix into a respective row thereof representing a multi-addressing connection, wherein each column of the respective multi-addressing matrix respectively represents an output line of the switching element;

identifying after reception of the multi-addressed cell in a respective switching element of the switching structure, an addressed row in the respective multi-addressing matrix using the respective row index information and, dependent on the respective routing information individually associated to coupling elements that are recited in the identified row, multi-addressing the cell to at least one output line of the respective switching element; and inserting, before forwarding of the cell to a further switching element of the switching structure, further row index information contained in routing information individually associated to the switching elements into the internal cell header of the communication system instead of the indicated row index information, said further row index information being inserted for the purpose of identifying a row of the multi-addressing matrix in the further switching element; and inserting into the cell, before forwarding of the cell to an output line of the switching element that is an output of the switching structure, the cell routing information entered in the multi-addressing matrix and removing the respective internal cell header of the communication system.

7. The method according to claim 6, wherein the routing information individually associated to the switching elements is formed by one of:

path information indicating non-forwarding, given non-forwarding of a multi-addressed cell to an output line of the switching element defined by a column of the multi-addressing matrix; and given forwarding of the multi-addressed cell to an output line of the respective switching element, path information indicating the corresponding forwarding of the multi-addressed cell and by row index information or cell routing information.

8. The method according to claim 6, wherein the method further comprises:

verifying routing information that is individually associated to the switching elements and that is recited in a row of the multi-addressing matrix identified on the basis of received row index information;

when said routing information is formed by path information that indicates non-forwarding, not switching the multi-addressed cell in the switching elements to an output line of the switching element in whose allocated column of the multi-addressing matrix the routing information individually associated to the switching elements is entered;

when said routing information is formed by path information indicating forwarding and by row index information, switching the multi-addressed cell to an allocated output line, the row index information being inserted into the internal cell header of the communication system instead of the received row index information; and when said routing information is forwarded by path information indicating forwarding and by translated cell routing information, switching the appertaining multi-addressed cell to an allocated output line of the switching element that is an output of the switching structure, the internal cell header of the communication system being removed and the translated cell routing information being inserted into the cell header of the multi-addressed cell instead of the received cell routing information.

9. The method according to claim 6, wherein the method further comprises:

providing a multi-addressing routine in every switching element for verification of respective internal cell headers of the communication system of multi-addressed cells and for the switching of the multi-addressed cells.

10. A method for multi-address transmission of cells in an n-stage switching structure of a communication system operating in the asynchronous transfer mode, a switching stage being formed by switching elements, comprising the steps of:

providing, preceding every cell and for cell self-routing through the switching structure using subscriber-signalled multi-addressing originating and destination information, an internal cell header of the communication system that is provided with internal routing information by a switching structure controller, wherein for multi-addressed connections the internal routing information is formed by multi-addressing information and by row index information;

allocating multi-addressing matrices to the switching elements, the multi-addressing matrices having routing information that is calculated using the switching structure controller, the routing information being individually associated to the switching elements and being respectively formed by path information and partially by respective row index information or cell routing information, respective routing information being entered column-by-column in a respective multi-addressing matrix into a respective row thereof representing a multi-addressing connection, wherein each column of the respective multi-addressing matrix respectively represents an output line of the switching element;

identifying after reception of the multi-addressed cell in a respective switching element of the switching structure, an addressed row in the respective multi-addressing matrix using the respective row index information and, dependent on the respective routing information individually associated to coupling elements that are recited in the identified row, multi-addressing the cell to at least one output line of the respective switching element, wherein before forwarding of a cell to a further switching element of the switching structure, further row index information contained in routing information individually associated to the switching elements is inserted into the internal cell header of the communication system instead of the indicated row index information, said further row index information being inserted for the purpose of identifying a row of the multi-addressing matrix in the further switching element; and verifying routing information that is individually associated to the switching elements and that is recited in a row of the multi-addressing matrix identified on the basis of received row index information such that, when said routing information is formed by path information that indicates non-forwarding, the multi-addressed cell is not switched in the switching elements to an output line of the switching element in whose allocated column of the multi-addressing matrix the routing information individually associated to the switching elements is entered, and such that, when said routing information is formed by path information indicating forwarding and by row index information, the multi-addressed cell is switched to an allocated output line, the row index information being inserted into the internal cell header of the communication system instead of the received row index information, and such that, when said routing information is forwarded by path information indicating forwarding and by translated cell routing information, the appertaining multi-addressed cell is switched to an allocated output line of the switching element that is an output of the switching structure, the internal cell header of the communication system being removed and the translated cell routing information being inserted into the cell header of the multi-addressed cell instead of the received cell routing information.

11. The method according to claim 10, wherein the method further comprises:

providing a multi-addressing routine in every switching element for verification of respective internal cell headers of the communication system of multi-addressed cells and for the switching of the multi-addressed cells.

12. The method according to claim 10, wherein the method further comprises:

before forwarding of a cell to an output line of the switching element that is an output of the switching structure, inserting into the cell the cell routing information entered in the multi-addressing matrix into the cell and removing the respective internal cell header of the communication system.

13. The method according to claim 10, wherein the routing information individually associated to the switching elements is formed by one of:

path information indicating non-forwarding, given non-forwarding of a multi-addressed cell to an output line of the switching element defined by a column of the multi-addressing matrix; and given forwarding of the multi-addressed cell to an output line of the respective switching element, path information indicating the corresponding forwarding of the multi-addressed cell and by row index information or cell routing information.

* * * * *